(12) United States Patent
Kmetz

(10) Patent No.: US 7,842,774 B2
(45) Date of Patent: Nov. 30, 2010

(54) PRECERAMIC SILAZANE POLYMER FOR CERAMIC MATERIALS

(75) Inventor: Michael A. Kmetz, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 497 days.

(21) Appl. No.: 11/782,002

(22) Filed: Jul. 24, 2007

(65) Prior Publication Data

US 2009/0030142 A1    Jan. 29, 2009

(51) Int. Cl.
C08G 77/62    (2006.01)
C08L 83/16    (2006.01)

(52) U.S. Cl. .............................. 528/32; 528/12; 528/38; 501/88; 501/97.1

(58) Field of Classification Search .................... 528/32, 528/12, 38; 501/88, 97.1
See application file for complete search history.

(56) References Cited

U.S. PATENT DOCUMENTS

| 4,340,619 | A | * | 7/1982 | Gaul, Jr. ..................... 427/228 |
|---|---|---|---|---|
| 4,482,669 | A | | 11/1984 | Seyferth |
| 4,720,532 | A | | 1/1988 | Seyferth |
| 4,722,988 | A | * | 2/1988 | Porte et al. ..................... 528/28 |
| 4,767,876 | A | | 8/1988 | Seyferth |
| 4,816,497 | A | * | 3/1989 | Lutz et al. ..................... 522/46 |
| 4,847,345 | A | | 7/1989 | Takamizawa |
| 4,869,854 | A | * | 9/1989 | Takeda et al. ............... 264/433 |
| 5,553,455 | A | | 9/1996 | Craig |
| 5,639,531 | A | | 6/1997 | Chen |
| 5,707,471 | A | | 1/1998 | Petrak |
| 6,063,327 | A | | 5/2000 | Semff |
| 6,228,437 | B1 | | 5/2001 | Schmidt |
| 6,627,126 | B2 | | 9/2003 | Schmidt |

FOREIGN PATENT DOCUMENTS

DE    3736914    5/1988

* cited by examiner

*Primary Examiner*—Kelechi C Egwim
(74) *Attorney, Agent, or Firm*—Carlson, Gaskey & Olds PC

(57) ABSTRACT

A method of forming a preceramic polymer includes treating a silane precursor having a vinyl moiety of ammonia to produce the preceramic polymer. For example, the silane precursor is trichlorovinylsilane. The preceramic polymer may then be cross-linked at a relatively low temperature by using a cross-linking agent.

7 Claims, 1 Drawing Sheet

PRECERAMIC SILAZANE POLYMER FOR CERAMIC MATERIALS

BACKGROUND OF THE INVENTION

This invention relates to preceramic polymers and, more particularly, to silazane preceramic polymers for manufacturing ceramic carbonitride materials and ceramic nitride materials.

Preceramic polymers are commonly used for forming ceramic materials. For example, preceramic polymers are combined with a reinforcement material into a desired shape and pyrolyzed to form a ceramic matrix composite. In particular, silazane preceramic polymers are used to form carbide, nitride, or carbonitride ceramic matrices for uses that require thermal resistance and high temperature strength.

Although effective, conventional preceramic polymers have several drawbacks that may limit use. For example, manufacturing a preceramic polymer from a set of reactants is often a complex and expensive process. The process may include large numbers of reactants and reaction steps, and utilize elevated temperatures. Additionally, one or more of the reactants may be expensive or somewhat difficult to procure. Also, the resulting chemistry of the preceramic polymer must have a high ceramic yield such that most of the preceramic polymer converts into ceramic during pyrolysis. Incomplete conversion into ceramic because of volatile loss during pyrolysis, for example, may result in a low ceramic yield and unsuitable quality of the resultant ceramic.

Accordingly, there is a need for a preceramic polymer and method of manufacture that provides a simplified and economic manufacturing process. This invention addresses those needs while avoiding the shortcomings and drawbacks of the prior art.

SUMMARY OF THE INVENTION

An example method of forming a preceramic polymer includes treating a silane precursor having a vinyl moiety with ammonia to produce a preceramic silazane polymer. For example, the silane precursor is trichlorovinylsilane.

In one example, the preceramic silazane polymer is subsequently cross-linked to produce a cross-linked preceramic silazane polymer having a vinyl moiety. The cross-linking may be achieved using a cross-linking temperature of 100° C. (212° F.) or less, by using a cross-linking agent, or by using a combination thereof. The example methods of forming the preceramic polymer result in a preceramic silazane polymer having a vinyl moiety that, when pyrolyzed, forms a ceramic material that includes at least one of a carbide or a nitride.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
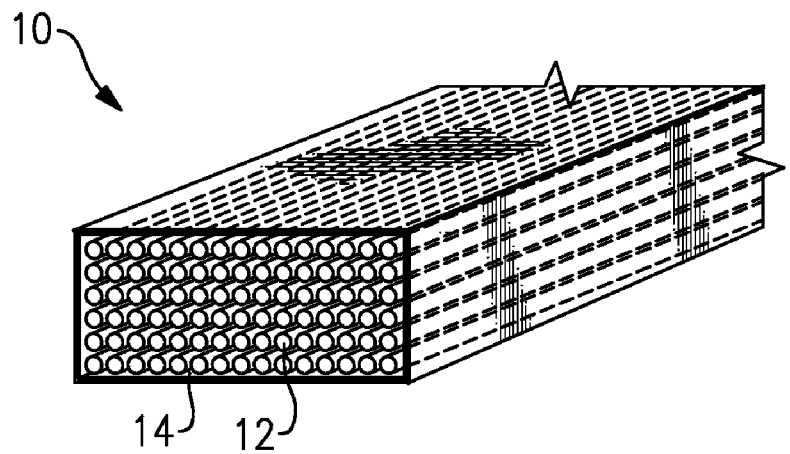
FIG. 1 is an example composite that includes a preceramic silazane polymer having a vinyl moiety.

FIG. 1 illustrates selected portions of an example composite 10. In this example, the composite 10 includes fiber reinforcement 12 that is impregnated with a preceramic silazane polymer 14 having a vinyl moiety. The fiber reinforcement 12 may include any suitable type of fiber reinforcement. In some examples, the fiber reinforcement includes continuous fibers, non-continuous fibers, woven fibers, ceramic fibers, silicon carbide fibers, boron nitride coated fibers, or combinations thereof. The preceramic silazane polymer 14 is pyrolyzable to a ceramic material that includes at least one of a carbide, a nitride, or both to form a fiber reinforced ceramic matrix composite having desirable mechanical strength and thermal resistance. It is to be understood that FIG. 1 is for illustrative purposes only and is not a limitation of the disclosed examples. Additionally, there are various other types of composites or non-composites that could benefit from the disclosed example preceramic silazane polymer 14.

In addition to providing the fiber reinforced ceramic matrix composite, the preceramic silazane polymer 14 also provides a relatively high ceramic yield and can be economically manufactured. For example, the preceramic silazane polymer 14 is formed by treating a silane precursor having a vinyl moiety with ammonia.

In one example, the preceramic silazane polymer 14 has the quality of being sticky. This allows the preceramic polymer 14 to be used in the manufacturing of high temperature fibers and paints as well as a high temperature sealant and adhesive.

Figure 2:
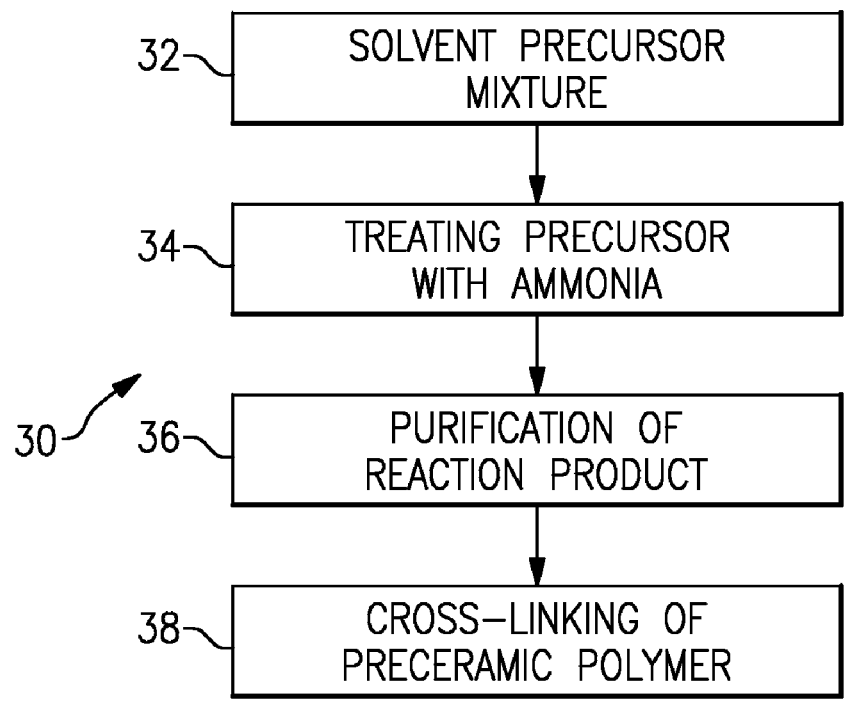
FIG. 2 is an example method for manufacturing a preceramic silazane polymer.

FIG. 2 illustrates one example method 30 for producing the preceramic silazane polymer 14 using the treatment of a silane precursor with ammonia. It is to be understood that the disclosed steps used in addition to the step of treating the silane precursor with ammonia are optional or may vary from the disclosed example, depending upon the particular requirements of a manufacturing process, the type and quality of the produced preceramic silazane polymer, or other manufacturing parameters.

In this example, the method 30 includes using a silane precursor having a vinyl moiety to produce the preceramic silazane polymer 14. For example, the silane precursor is trichlorovinylsilane. In a further example, the trichlorovinylsilane is reagent grade (97%) trichlorovinylsilane. At step 32, the silane precursor is mixed with a carrier solvent, such as tetrahydrofuran, in a mixture comprising 10 parts of the tetrahydrofuran and 1 part silane precursor. The silane precursor may be mixed with the tetrahydrofuran in a container, such as a three neck round bottom flask equipped with a reflux condenser and a thermometer. For larger scale production, other types of suitable containers may be used.

At step 34, the silane precursor is treated with the ammonia. For example, the temperature of the mixture of the carrier solvent and the silane precursor is controlled to be between about −10° C. and 10° C. while ammonia gas is introduced. The low temperature prevents the tetrahydrofuran from boiling off during the exothermal reaction between the ammonia and the preceramic silane precursor. For example, the container having the carrier solvent and silane precursor mixture is cooled to approximately 0° C. using ice. To facilitate exposure between the silane precursor and the ammonia gas, the mixture may be mechanically stirred. Alternatively, the treatment is conducted at ambient temperature.

The formula below shows the reaction between the ammonia and the trichlorovinylsilane precursor under the above conditions. The reaction produces polycarbovinylsilazane (i.e. the preceramic silazane polymer 14) and an ammonium chloride byproduct.

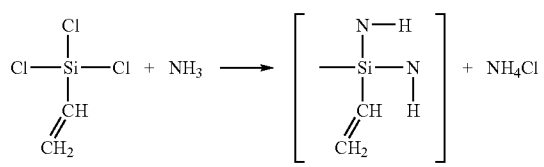

At step 36, the preceramic silazane polymer 14 is purified by separating out the ammonium chloride byproduct and solvent. For example, the ammonium chloride is removed by filtering, and the solvent is extracted using evaporation (e.g., a roto-vap or other suitable evaporation device). In the disclosed example, the preceramic silazane polymer 14 produced in the above process is a pale yellow liquid having a density of approximately 1.0 g/cm$^3$ or higher. Optionally, the preceramic silazane polymer 14 may be subsequently mixed with a solvent, such as an ester, an aromatic hydrocarbon, a ketone, or an alcohol, or reacted with an acid or a base to form a desired mixture. In some examples, the desired mixture may be for storage purposes to extend a shelf-life of the preceramic silazane polymer 14.

At step 38, the preceramic silazane polymer 14 product is cross-linked to form a semi-solid that is suitable for making the composite 10, for example. In other examples, it may be desirable to use the preceramic silazane polymer 14 as a liquid, or limit the cross-linking to achieve a desired target molecular weight.

The cross-linking of step 38 may be achieved using any of a variety of different methods. For example, the preceramic silazane polymer 14 may be heated at a temperature of about 100° C. or less to initiate cross-linking and polymerize the preceramic silazane polymer 14. In another example, a cross-linking agent may be added to the preceramic silazane polymer 14 as a radical initiator to lower the cross-linking temperature and polymerize the preceramic silazane polymer 14 at near ambient temperatures. The term "about" as used in this description relative to temperatures, compositions, physical properties or the like refers to possible variation in the given value, such as normally accepted variations or tolerances in the art. The preceramic silazane polymer 14 may also be cross-linked by exposure to the moisture in the air.

The vinyl moiety of the preceramic silazane polymer 14 provides the benefit of allowing a cross-linking agent such as dicumyl peroxide to be used rather than hydride type cross-linking agents. In one example, about 1 wt % of dicumyl peroxide is added to the preceramic silazane polymer 14 for cross-linking. Amounts other than 1 wt % may be used to achieve a greater or lesser degree of cross-linking. Using dicumyl peroxide and a temperature of 100° C. or less provides the benefit of avoiding the expense and inconvenience of using elevated cross-linking temperatures. Additionally, using dicumyl peroxide and a temperature of less than about 100° C. increases the ceramic yield of the preceramic silazane polymer 14, which lowers the shrinkage and tendency to crack during pyrolysis.

In one example the molecular weight of the preceramic silazane polymer 14 is about 800-1000 g/mol. In a further example, the molecular weight is between about 874-894 g/mol. In a further example, the molecular weight is about 884 g/mol. Given this description, one of ordinary skill in the art will recognize that variation in the steps of the method 30, such as varying the amount of cross-linking agent or varying the cross-linking temperature, may be used to vary the molecular weight of the preceramic silazane polymer 14.

The cross-linked preceramic silazane polymer 14 may then be incorporated into the composite 10 (FIG. 1), into another type of composite, used to form a monolithic ceramic material, or the like. For example, the preceramic silazane polymer 14 may be applied to plies of the fiber reinforcement 12 and consolidated under pressure and elevated temperature to form a green body. The green body may then be pyrolyzed, as will described below, and subsequently infiltrated with additional amounts of the preceramic silazane polymer 14 before another cycle of pyrolysis. The cycle may be continued until achieving a desirable final density. In one example, the final density is about 2.0 g/cm$^3$ with about 45 vol % of the fiber reinforcement 12. Alternatively, other processes known to be suitable for forming preceramic polymers into desired shapes may be used, such as vacuum impregnation techniques. For example, plies of fabric are impregnated with the preceramic silazane polymer 14 and placed inside a vacuum bag. Bleeder cloth and a release film are placed around the laminate to provide an even pressure gradient. A vacuum is pulled on the bag and the preceramic silazane polymer 14 is sucked into the plies, consolidating the laminate. This bag is placed inside an autoclave and heated to form a green body. The vacuum bag is removed, and the green body is re-infiltrated and placed back inside the autoclave. The green body is then heated up to around 1000° C. in nitrogen to form the ceramic matrix composite. Several more iterations of reinfiltrations and autoclave cycles, seven to ten for example, may be used to achieve a desired density.

The preceramic silazane polymer 14 is pyrolyzed at a predetermined pyrolysis temperature to convert the preceramic silazane polymer 14 into a ceramic material. The preceramic silazane polymer 14 may be pyrolyzed according to methods already known for pyrolyzing preceramic polymers. In the disclosed examples, the preceramic silazane polymer 14 results in a ceramic yield of about 75-80%.

In one example, the preceramic silazane polymer 14 is heated to about 1000° C. or higher at a rate of about 1° C./min in a nitrogen atmosphere. The preceramic silazane polymer 14 may be held at the peak temperature for a predetermined amount of time. Using a pyrolysis temperature of about 1000° C. converts the preceramic silazane polymer 14 into a ceramic material having crystalline silicon nitride phase dispersed through a glassy silicon carbonitride phase. In another example, using a pyrolysis temperature of about 1500° C. or higher is expected to transform substantially all of the preceramic silazane polymer 14 into crystalline silicon nitride. Other pyrolysis temperatures, heating profiles, or processing conditions may form silicon carbide in addition to or instead of silicon nitride or silicon carbonitride.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of forming a preceramic silazane polymer, comprising:

mixing tetrahydrofuran as a carrier solvent with a silane precursor that includes trichlorovinylsilane in a ratio of about 10 parts of the tetrahydrofuran to about 1 part of the trichlorovinylsilane;

treating the silane precursor with ammonia; and adding a cross-linking agent to the silane precursor, wherein the cross-linking agent is dicumyl peroxide, to initiate cross-linking of the trichlorovinylsilane and produce the preceramic silazane polymer.

2. The method as recited in claim 1, including producing a byproduct that includes ammonium chloride.

3. The method as recited in claim 2, including filtering to separate ammonium chloride byproduct from the preceramic silazane polymer.

4. The method as recited in claim 1, including extracting the carrier solvent under a vacuum to separate the carrier solvent from the preceramic silazane polymer.

5. The method as recited in claim 1, including treating at a temperature of about −10° C. to 10° C.

6. The method as recited in claim 5, including treating at a temperature of about 0° C.

7. The method as recited in claim 1, including adding about 1 wt. % of the dicumyl peroxide to the silane precursor.

* * * * *